(12) United States Patent
Osaki et al.

(10) Patent No.: US 9,748,602 B2
(45) Date of Patent: Aug. 29, 2017

(54) SULFIDE SOLID ELECTROLYTE MATERIAL, BATTERY, AND PRODUCING METHOD FOR SULFIDE SOLID ELECTROLYTE MATERIAL

(71) Applicant: TOYOTA JIDOSHA KABUSHIKI KAISHA, Toyota-shi, Aichi-ken (JP)

(72) Inventors: Mayuko Osaki, Susono (JP); Yuki Kato, Gotenba (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 13 days.

(21) Appl. No.: 14/783,604

(22) PCT Filed: Apr. 16, 2014

(86) PCT No.: PCT/JP2014/060819
§ 371 (c)(1),
(2) Date: Oct. 9, 2015

(87) PCT Pub. No.: WO2014/171483
PCT Pub. Date: Oct. 23, 2014

(65) Prior Publication Data
US 2016/0064771 A1 Mar. 3, 2016

(30) Foreign Application Priority Data
Apr. 16, 2013 (JP) ................. 2013-085767

(51) Int. Cl.
*H01M 10/0562* (2010.01)
*C01B 25/45* (2006.01)
(Continued)

(52) U.S. Cl.
CPC ......... *H01M 10/0562* (2013.01); *C01B 25/45* (2013.01); *H01B 1/10* (2013.01);
(Continued)

(58) Field of Classification Search
CPC ................. H01M 10/0562; H01M 10/052
See application file for complete search history.

(56) References Cited

U.S. PATENT DOCUMENTS

| 2013/0040208 A1* | 2/2013 | Kanno ............... C01B 17/20 |
| | | 429/319 |
| 2014/0147753 A1 | 5/2014 | Homma et al. |
| 2014/0363745 A1 | 12/2014 | Hirayama et al. |
| 2015/0017548 A1 | 1/2015 | Kato et al. |
| 2015/0037687 A1 | 2/2015 | Kanno et al. |

FOREIGN PATENT DOCUMENTS

| JP | 2013-033659 A | 2/2013 |
| JP | 2013-037897 A | 2/2013 |

(Continued)

OTHER PUBLICATIONS

Hwang et al. (J. Am. Chem. Soc. 1998, 120, 7337-7346).*
(Continued)

*Primary Examiner* — Olatunji Godo
(74) *Attorney, Agent, or Firm* — Oliff PLC (57) ABSTRACT

A sulfide solid electrolyte material with favorable ion conductivity and high reduction resistance. The object is attained by providing sulfide solid electrolyte material comprising: Li element; Ge element; P element; and S element, wherein the sulfide solid electrolyte material peaks at a position of $2\theta=29.58°\pm0.50°$ in X-ray diffraction measurement using CuKα ray, the sulfide solid electrolyte material does not peak at a position of $2\theta=27.33°\pm0.50°$ in X-ray diffraction measurement using CuKα ray or when diffraction intensity at the peak of $2\theta=29.58°\pm0.50°$ is regarded as $I_A$ and diffraction intensity at the peak of $2\theta=27.33°\pm0.50°$ is regarded as $I_B$, a value of $I_B/I_A$ is less than 1.0, and part of the P element in a crystal phase peaking at the position of $2\theta=29.58°\pm0.50°$ is substituted with a B element.

12 Claims, 6 Drawing Sheets

(51) Int. Cl.
- *H01M 10/052* (2010.01)
- *H01B 1/12* (2006.01)
- *H01B 1/10* (2006.01)
- *H01M 10/0525* (2010.01)
- *C01B 35/14* (2006.01)

(52) U.S. Cl.
CPC .......... *H01B 1/122* (2013.01); *H01M 10/052* (2013.01); *H01M 10/0525* (2013.01); *C01B 35/14* (2013.01); *H01M 2220/20* (2013.01); *H01M 2220/30* (2013.01); *H01M 2300/002* (2013.01); *H01M 2300/0068* (2013.01)

(56) References Cited

FOREIGN PATENT DOCUMENTS

| WO | 2011/118801 | A1 | 9/2011 |
|----|-------------|-----|--------|
| WO | WO2011118801 | * | 9/2011 |
| WO | 2013/024537 | A1 | 2/2013 |
| WO | 2013/094757 | A1 | 6/2013 |
| WO | 2013/118722 | A1 | 8/2013 |
| WO | 2013/118723 | A1 | 8/2013 |

OTHER PUBLICATIONS

Kanno, Ryoji et al., "Lithium Ionic Conductor Thio-LISICON The Li2S-GeS2-P2S5 System", Journal of The Electrochemical Society, 148 (7) A742-A746 (2001).

Kamaya, Noriaki et al., "A lithium superionic conductor", Nature Materials, Advanced online publication, Jul. 31, 2011, DOI:10.1038/NMAT3066.

Ong, Shyue Ong et al., "Phase stability, electrochemical stability and ionic conductivity in the Li $10\pm1MP2X12$ (M=Ge, Si, Sn, Al or P, and X=O, S or Se) family of superionic conductors", Energy and Environmental Science, doi, 10.1039C2ee23355J (2012), pp. 1-22.

Rakada, Kazunori et al., "Lithium ion conductive oxysulfide, Li3PO4-Li3PS4", Solid State Ionics 176 (2005), pp. 2355-2359.

* cited by examiner

FIG. 1

UPPER ROW: SULFIDE SOLID ELECTROLYTE MATERIAL WITH HIGH ION CONDUCTIVITY
LOWER ROW: SULFIDE SOLID ELECTROLYTE MATERIAL WITH LOW ION CONDUCTIVITY

SULFIDE SOLID ELECTROLYTE MATERIAL, BATTERY, AND PRODUCING METHOD FOR SULFIDE SOLID ELECTROLYTE MATERIAL

TECHNICAL FIELD

The present invention relates to a sulfide solid electrolyte material with favorable ion conductivity and high reduction resistance.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

Liquid electrolyte containing a flammable organic solvent is used for a presently commercialized lithium battery, so that the installation of a safety device for restraining temperature rise during a short circuit and the improvement in structure and material for preventing the short circuit are necessary therefor. On the contrary, a lithium battery all-solidified by replacing the liquid electrolyte with a solid electrolyte layer is conceived to intend the simplification of the safety device and be excellent in production cost and productivity for the reason that the flammable organic solvent is not used in the battery.

A sulfide solid electrolyte material is known as a solid electrolyte material used for an all solid lithium battery. For example, in Non Patent Literature 1, an Li ion conductor (a sulfide solid electrolyte material) having a composition of $Li_{(4-x)}Ge_{(1-x)}P_xS_4$ is disclosed. Also, in Patent Literature 1, an LiGePS-based sulfide solid electrolyte material with a high ratio of a crystal phase having a specific peak in X-ray diffraction measurement is disclosed. In addition, in Non Patent Literature 2, an LiGePS-based sulfide solid electrolyte material is disclosed.

CITATION LIST

Patent Literature

Patent Literature 1: WO 2011/118801 A

Non Patent Literature

Non Patent Literature 1: Ryoji Kanno et al., "Lithium Ionic Conductor Thio-LISICON The $Li_2S$—$GeS_2$—$P_2S_5$ System", Journal of The Electrochemical Society, 148 (7) A742-A746 (2001)

Non Patent Literature 2: Noriaki Kamaya et al., "A lithium superionic conductor", Nature Materials, Advanced online publication, 31 Jul. 2011, DOI:10.1038/NMAT3066

SUMMARY OF INVENTION

Technical Problem

A solid electrolyte material with favorable ion conductivity is demanded from the viewpoint of achieving higher output of a battery. In Patent Literature 1, it is disclosed that a sulfide solid electrolyte material with a high ratio of a crystal phase having a specific peak in X-ray diffraction measurement has favorable ion conductivity. Meanwhile, the problem is that an LiGePS-based sulfide solid electrolyte material described in Patent Literature 1 is low in reduction resistance (in particular, reduction resistance during charge).

The present invention has been made in view of the problem, and the main object thereof is to provide a sulfide solid electrolyte material with favorable ion conductivity and high reduction resistance.

Solution to Problem

In order to solve the problem, the present invention provides a sulfide solid electrolyte material comprising: a Li element; a Ge element; a P element; and a S element, characterized in that the sulfide solid electrolyte material has a peak at a position of $2\theta=29.58°\pm0.50°$ in X-ray diffraction measurement using a CuKα ray, the sulfide solid electrolyte material does not have a peak at a position of $2\theta=27.33°\pm0.50°$ in X-ray diffraction measurement using a CuKα ray or in the case of the sulfide solid electrolyte material having a peak at the position of $2\theta=27.33°\pm0.50°$, when diffraction intensity at the peak of $2\theta=29.58°\pm0.50°$ is regarded as $I_A$ and diffraction intensity at the peak of $2\theta=27.33°\pm0.50°$ is regarded as $I_B$, a value of $I_B/I_A$ is less than 0.50, and a part of the P element in a crystal phase having the peak at the position of $2\theta=29.58°\pm0.50°$ is substituted with a B element.

According to the present invention, the ratio of a crystal phase having a peak in the vicinity of $2\theta=29.58°$ is so high as to allow the sulfide solid electrolyte material with favorable ion conductivity. In addition, the substitution of part of the P element with a B element allows the sulfide solid electrolyte material with high reduction resistance.

The present invention provides a sulfide solid electrolyte material comprising: a Li element; a Ge element; a B element; and a S element, characterized in that the sulfide solid electrolyte material has a peak at a position of $2\theta=29.58°\pm0.50°$ in X-ray diffraction measurement using a CuKα ray, the sulfide solid electrolyte material does not have a peak at a position of $2\theta=27.33°\pm0.50°$ in X-ray diffraction measurement using a CuKα ray or in the case of the sulfide solid electrolyte material having a peak at the position of $2\theta=27.33°\pm0.50°$, when diffraction intensity at the peak of $2\theta=29.58°\pm0.50°$ is regarded as $I_A$ and diffraction intensity at the peak of $2\theta=27.33°\pm0.50°$ is regarded as $I_B$, a value of $I_B/I_A$ is less than 0.50, and a crystal phase having the peak at the position of $2\theta=29.58°\pm0.50°$ does not contain a P element, and the B element is located at a site for the P element.

According to the present invention, the ratio of a crystal phase having a peak in the vicinity of $2\theta=29.58°$ is so high as to allow the sulfide solid electrolyte material with favorable ion conductivity. In addition, the predetermined crystal phase does not contain a P element and the B element is located at a site for the P element, so as to allow the sulfide solid electrolyte material with high reduction resistance.

The present invention provides a sulfide solid electrolyte material having an octahedron O composed of a Li element and a S element, a tetrahedron $T_1$ composed of an $M_a$ element and a S element, and a tetrahedron $T_2$ composed of an $M_b$ element and a S element, the tetrahedron $T_1$ and the octahedron O sharing an edge, and the tetrahedron $T_2$ and the octahedron O containing a crystal structure sharing a corner as the main body, characterized in that the $M_a$ element contains a Ge element and a P element, the $M_b$ element contains a P element, and part of the P element is substituted with a B element.

According to the present invention, the octahedron O, the tetrahedron $T_1$ and the tetrahedron $T_2$ have a predetermined crystal structure (a three-dimensional structure), so as to allow the sulfide solid electrolyte material with favorable ion conductivity. In addition, the substitution of part of the P element with a B element allows the sulfide solid electrolyte material with high reduction resistance.

The present invention provides a sulfide solid electrolyte material having an octahedron O composed of a Li element and a S element, a tetrahedron $T_1$ composed of an $M_a$ element and a S element, and a tetrahedron $T_2$ composed of an $M_b$ element and a S element, the tetrahedron $T_1$ and the octahedron O sharing an edge, and the tetrahedron $T_2$ and the octahedron O containing a crystal structure sharing a corner as the main body, characterized in that the $M_a$ element contains a Ge element and a B element, the $M_b$ element contains a B element, the crystal structure does not contain a P element, and the B element is located at a site for the P element.

According to the present invention, the octahedron O, the tetrahedron $T_1$ and the tetrahedron $T_2$ have a predetermined crystal structure (a three-dimensional structure), so as to allow the sulfide solid electrolyte material with favorable ion conductivity. In addition, the predetermined crystal structure does not contain a P element and the B element is located at a site for the P element, so as to allow the sulfide solid electrolyte material with high reduction resistance.

The present invention provides a battery comprising a cathode active material layer containing a cathode active material, an anode active material layer containing an anode active material, and an electrolyte layer formed between the cathode active material layer and the anode active material layer, characterized in that at least one of the cathode active material layer, the anode active material layer and the electrolyte layer contains the sulfide solid electrolyte material described above.

According to the present invention, the use of the sulfide solid electrolyte material described above allows the battery with high output and high reduction resistance.

The present invention provides a producing method for a sulfide solid electrolyte material, the sulfide solid electrolyte material being the sulfide solid electrolyte material described above, comprising: an ion conductive material synthesizing process of synthesizing an amorphized ion conductive material by mechanical milling with a raw material composition containing a constituent of the sulfide solid electrolyte material, and a heating process of obtaining the sulfide solid electrolyte material by heating the amorphized ion conductive material.

According to the present invention, amorphization is performed in the ion conductive material synthesizing step to thereafter perform the heating step, so as to allow the sulfide solid electrolyte material such that the ratio of a crystal phase having a peak in the vicinity of $2\theta=29.58°$ is high. Thus, the sulfide solid electrolyte material with favorable ion conductivity may be obtained. In addition, the B element is located at a site for the P element, so as to allow the sulfide solid electrolyte material with high reduction resistance.

Advantageous Effects of Invention

The present invention produces the effect such as to allow a sulfide solid electrolyte material with favorable ion conductivity and high reduction resistance.

DESCRIPTION OF EMBODIMENTS

A sulfide solid electrolyte material, a battery and a producing method for a sulfide solid electrolyte material of the present invention are hereinafter described in detail.

A. Sulfide Solid Electrolyte Material

First, a sulfide solid electrolyte material of the present invention is described. The sulfide solid electrolyte material of the present invention may be roughly divided into four embodiments. Then, the sulfide solid electrolyte material of the present invention is described while divided from a first embodiment to a fourth embodiment.

1. First Embodiment

A sulfide solid electrolyte material of a first embodiment comprises a Li element, a Ge element, a P element and a S element, characterized in that the sulfide solid electrolyte has a peak at a position of $2\theta=29.58°\pm0.50°$ in X-ray diffraction measurement using a CuKα ray, the sulfide solid electrolyte material does not have a peak at a position of $2\theta=27.33°\pm0.50°$ in X-ray diffraction measurement using a CuKα ray or in a case of the sulfide solid electrolyte has a peak at a position of $2\theta=27.33°\pm0.50°$, when diffraction intensity at the peak of $2\theta=29.58°\pm0.50°$ is regarded as $I_A$ and diffraction intensity at the peak of $2\theta=27.33°\pm0.50°$ is regarded as $I_B$, a value of $I_B/I_A$ is less than 0.50, and a part of the P element in a crystal phase having the peak at the position of 2θ=29.58°±0.50° is substituted with a B element.

According to the first embodiment, the ratio of a crystal phase having a peak in the vicinity of 2θ=29.58° is so high as to allow the sulfide solid electrolyte material with favorable ion conductivity. In addition, the substitution of part of the P element with a B element allows the sulfide solid electrolyte material with high reduction resistance. Here, the B element is reduced more easily than the Ge element as to be reduced before the Ge element, becomes an insulator (zerovalent B) and allows a decomposition reaction to be prevented from proceeding. Incidentally, a detailed mechanism is described later by using FIGS. 2 and 3. The B element and the P element are so close in ionic radius that distortion of a crystal lattice due to the substitution is small to allow ion conductance to be inhibited from deteriorating.

Figure 1:
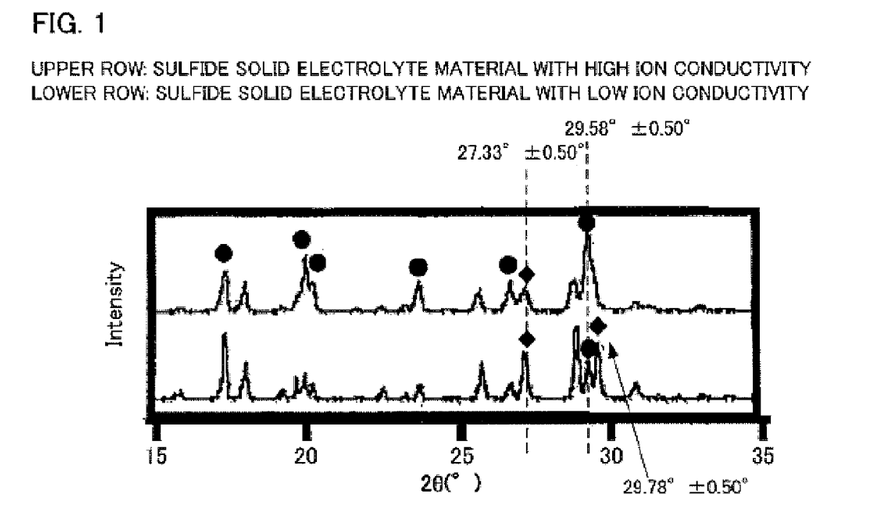
FIG. 1 is an X-ray diffraction spectrum explaining a difference between a sulfide solid electrolyte material with high ion conductivity and a sulfide solid electrolyte material with low ion conductivity.

FIG. 1 is an X-ray diffraction spectrum explaining a difference between a sulfide solid electrolyte material with high ion conductivity and a sulfide solid electrolyte material with low ion conductivity. Incidentally, both of the two sulfide solid electrolyte materials in FIG. 1 have a composition of $Li_{3.25}Ge_{0.25}P_{0.75}S_4$. In FIG. 1, the sulfide solid electrolyte material with high ion conductivity has a peak at a position of 2θ=29.58°±0.50° and a position of 2θ=27.33°±0.50°. Also, in FIG. 1, the sulfide solid electrolyte material with low ion conductivity has the same peak. Here, it is conceived that a crystal phase having a peak in the vicinity of 2θ=29.58° and a crystal phase having a peak in the vicinity of 2θ=27.33° are crystal phases different from each other. Incidentally, in the first embodiment, the crystal phase having a peak in the vicinity of 2θ=29.58° and the crystal phase having a peak in the vicinity of 2θ=27.33° are occasionally referred to as 'crystal phase A' and 'crystal phase B', respectively. The crystal structure of this crystal phase A is conceived to be the crystal structure described in the after-mentioned third and fourth embodiments.

Both of the crystal phases A and B are crystal phases exhibiting ion conductivity, which is different. The crystal phase A is conceived to be remarkably high in ion conductivity as compared with the crystal phase B. A conventional synthesis method (such as a solid-phase method) has not been capable of decreasing the ratio of the crystal phase B with low ion conductivity, and has not been capable of sufficiently heightening ion conductivity. On the contrary, in the first embodiment, the crystal phase A with high ion conductivity may be precipitated so positively as to allow the sulfide solid electrolyte material with high ion conductivity.

Also, in the first embodiment, in order to distinguish from the sulfide solid electrolyte material with low ion conductivity, diffraction intensity at a peak in the vicinity of 2θ=29.58° is regarded as $I_A$ and diffraction intensity at a peak in the vicinity of 2θ=27.33° is regarded as $I_B$, and a value of $I_B/I_A$ is prescribed at less than 0.50. Incidentally, it is conceived that a conventional synthesis method has not allowed the sulfide solid electrolyte material such that a value of $I_B/I_A$ is less than 0.50. Also, from the viewpoint of ion conductivity, the sulfide solid electrolyte material of the first embodiment is preferably high in the ratio of the crystal phase A with high ion conductivity. Thus, a value of $I_B/I_A$ is preferably smaller; specifically, preferably 0.45 or less, more preferably 0.25 or less, far more preferably 0.15 or less, particularly preferably 0.07 or less. Also, a value of $I_B/I_A$ is preferably 0. In other words, it is preferable that the sulfide solid electrolyte material of the first embodiment does not have a peak in the vicinity of 2θ=27.33° as a peak of the crystal phase B.

The sulfide solid electrolyte material of the first embodiment has a peak in the vicinity of 2θ=29.58°. This peak is one of the peaks of the crystal phase A with high ion conductivity, as described above. Here, 2θ=29.58° is an actual measurement value, and a crystal lattice changes somewhat due to factors such as material composition, so that a position of the peak occasionally shifts somewhat from 2θ=29.58°. Thus, in the first embodiment, the peak of the crystal phase A is defined as a peak at a position of 2θ=29.58°±0.50°. The crystal phase A is ordinarily conceived to have peaks of 2θ=17.38°, 20.18°, 20.44°, 23.56°, 23.96°, 24.93°, 26.96°, 29.07°, 29.58°, 31.71°, 32.66° and 33.39°. Incidentally, also these peak positions occasionally shift in a range of ±0.50°.

On the other hand, the peak in the vicinity of 2θ=27.33° is one of the peaks of the crystal phase B with low ion conductivity, as described above. Here, 2θ=27.33° is an actual measurement value, and a crystal lattice changes somewhat due to factors such as material composition, so that a position of the peak occasionally shifts somewhat from 2θ=27.33°. Thus, in the first embodiment, the peak of the crystal phase B is defined as a peak at a position of 2θ=27.33°±0.50°. The crystal phase B is ordinarily conceived to have peaks of 2θ=17.46°, 18.12°, 19.99°, 22.73°, 25.72°, 27.33°, 29.16° and 29.78°. Incidentally, also these peak positions occasionally shift in a range of ±0.50°.

Figure 2:
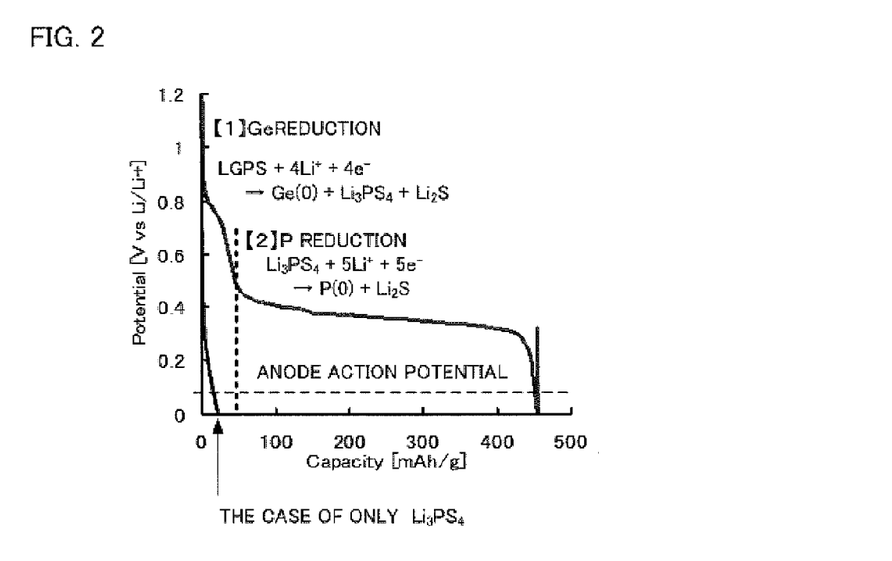
FIG. 2 is an explanatory view explaining a decomposition reaction of a sulfide solid electrolyte material.

In the first embodiment, the crystal structure of the crystal phase A is typically represented by $Li_{10}GeP_2S_{12}$. The crystal structure of $Li_{10}GeP_2S_{12}$ or the sulfide solid electrolyte material containing this crystal structure as the main body is referred to as LGPS. LGPS has the advantage that ion conductivity is favorable but the problem that reduction potential is so comparatively high as to be easily subject to reductive decomposition. Through earnest studies on this problem, the inventors have found out that reduction potential of Ge in LGPS is higher than that of P that Ge is reduced before. Specifically, as shown in FIG. 2, they have found out that Ge of LGPS is first reduced to produce zerovalent Ge (or zerovalent or less Ge such as $Li_xGe$ (x=0 to 4.4); incidentally, these are collectively referred to as zerovalent Ge and the like), $Li_3PS_4$ and $Li_2S$, and subsequently P of $Li_3PS_4$ is reduced to produce zerovalent P (or zerovalent or less P such as $Li_3P$; incidentally, these are collectively referred to as zerovalent P and the like) and $Li_2S$. That is to say, they have found out that a decomposition reaction is caused in order of Ge reduction and P reduction. The reaction formula of Ge reduction and P reduction is concluded to be proper for the reason that reduction potential calculated by first-principle calculation (calculated value) and reduction potential of LGPS actually synthesized (experimental value) correspond.

Figure 3A:
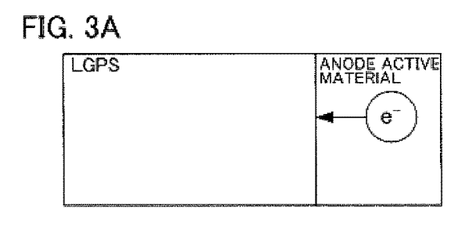
FIGS. 3A to 3F are explanatory views explaining a decomposition reaction of a sulfide solid electrolyte material.
Figure 3B:
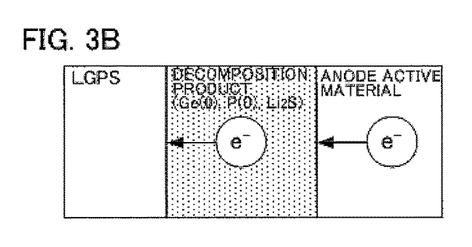
Figure 3C:
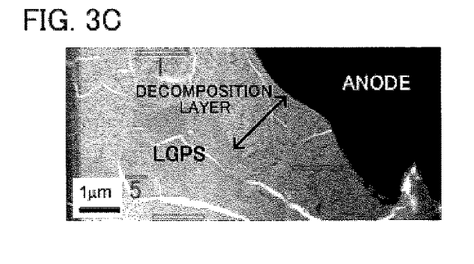

As shown in FIGS. 3A and 3B, when LGPS and an anode active material contact, an electron (e⁻) caused from the anode active material offends LGPS to thereby decompose LGPS. Zerovalent Ge and the like produced by the decomposition of LGPS have conductivity (electron conduction), so that the decomposition reaction of LGPS proceeds further. P of $Li_3PS_4$ is reduced in the reductive decomposition reaction of LGPS; however, in the case of only $Li_3PS_4$, P of $Li_3PS_4$ is not reduced (refer to FIG. 2). The reason is conceived to be that the presence of zerovalent Ge and the like around $Li_3PS_4$ offers an environment in which P of $Li_3PS_4$ is easily reduced. In fact, as shown in FIG. 3C, it can be confirmed that a layer of a decomposition product of LGPS is produced.

Figure 3D:
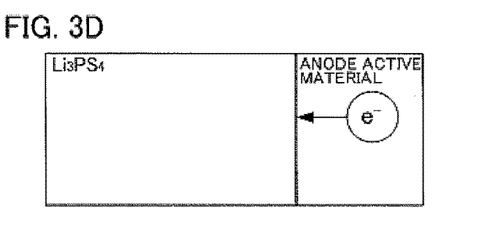
Figure 3E:
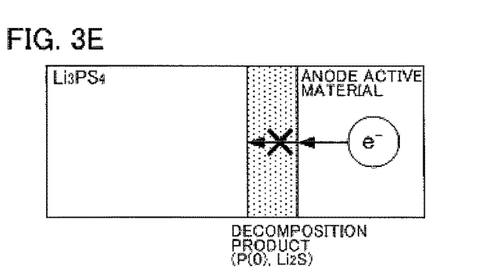
Figure 3F:
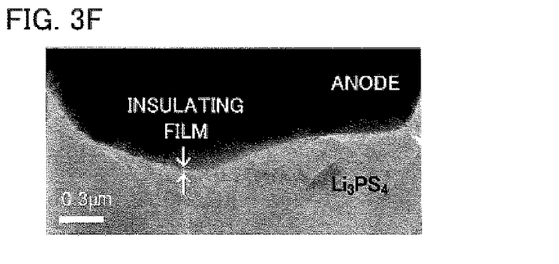

In contrast, as shown in FIGS. 3D and 3E, when $Li_3PS_4$ and an anode active material contact, an electron (e⁻) caused from the anode active material offends $Li_3PS_4$ to thereby decompose $Li_3PS_4$. Zerovalent P and the like and $Li_2S$ produced by the decomposition of $Li_3PS_4$ are insulators, so that the decomposition reaction of $Li_3PS_4$ does not proceed. In fact, as shown in FIG. 3F, a layer of a decomposition product of $Li_3PS_4$ (an insulating film) is extremely thin.

The sulfide solid electrolyte material of the first embodiment has been developed by noticing this phenomenon; in LGPS, B as an element which is reduced more easily than Ge to become an insulator by the reduction is adopted instead of P which is reduced with more difficulty than Ge, so that the improvement of reduction resistance is intended. Incidentally, the substitution of Ge in LGPS with B is described in Example 19 of Patent Literature 1; however, as described in the after-mentioned Examples, the substitution of Ge with B causes ion conductance to lower. In contrast, in the first embodiment, B and P are so close in ionic radius that distortion of a crystal lattice due to the substitution even in substituting P with B is small to allow ion conductance to be inhibited from deteriorating. That is to say, a great technical characteristic is not the substitution of Ge with B but the substitution of P with B.

The sulfide solid electrolyte material of the first embodiment comprises the Li element, the Ge element, the P element, the B element and the S element. The sulfide solid electrolyte material of the first embodiment may be composed of only the Li element, the Ge element, the P element, the B element and the S element, or further comprise another element. Incidentally, in the first embodiment, a site of each element in the crystal structure of $Li_{10}GeP_2S_{12}$ is occasionally referred to as a site for the Li element, a site for the Ge element, a site for the P element and a site for the S element.

In the first embodiment, part of the P element is substituted with the B element. Specifically, part of the P element in $Li_{13}GeP_2S_{12}$ is substituted with the B element. The substituted amount of the B element in a site for the P element is, for example, preferably 10% or more, more preferably 20% or more. The reason is that too small substituted amount of the B element brings a possibility that the improvement of reduction resistance may not sufficiently intended. The substituted amount of the B element may be determined by Rietveld analysis of XRD, for example. On the other hand, it is preferable that the Ge element in $Li_{10}GeP_2S_{12}$ is not substituted with the B element. The reason is to allow ion conductance to be inhibited from deteriorating. The substituted amount of the B element in a site for the Ge element is, for example, preferably 50% or less, more preferably 30% or less. The substituted amount of the B element in a site for the Ge element is preferably smaller than the substituted amount of the B element in a site for the P element.

Part of the S element may be substituted with the O element. Specifically, part of the S element in $Li_{10}GeP_2S_{12}$ may be substituted with the O element. The substituted amount of the O element in a site for the S element is, for example, preferably 0.1% or more, more preferably 0.5% or more. The substituted amount ratio of the O element is, for example, preferably 50% or less, more preferably 34% or less. The substituted amount of the O element may be determined by Rietveld analysis of XRD, for example.

The composition of the sulfide solid electrolyte material of the first embodiment is not particularly limited if the composition is a composition such as to allow a predetermined value of $I_B/I_A$, but is, for example, preferably a composition in which part of the P element in $Li_{(4-x)}Ge_{(1-x)}P_xS_4$ (x satisfies $0<x<1$) is substituted with the B element. The composition of $Li_{(4-x)}Ge_{(1-x)}P_xS_4$ corresponds to the composition of a solid solution of $Li_3PS_4$ and $Li_4GeS_4$. That is to say, this composition corresponds to the composition on a tie line of $Li_3PS_4$ and $Li_4GeS_4$. Both $Li_3PS_4$ and $Li_4GeS_4$ correspond to an ortho-composition and have the advantage that chemical stability is high. "x" satisfies preferably $0.4 \leq x$, more preferably $0.6 \leq x$, for example. On the other hand, the "x" satisfies preferably $x \leq 0.8$, more preferably $x \leq 0.75$, for example. The composition of the sulfide solid electrolyte material may be a composition in which part of the S element in the composition described above is substituted with the O element.

The sulfide solid electrolyte material of the first embodiment is ordinarily a crystalline sulfide solid electrolyte material. The sulfide solid electrolyte material of the first embodiment is preferably high in ion conductivity, and ion conductivity of the sulfide solid electrolyte material at a temperature of 25° C. is preferably $1.0 \times 10^{-3}$ S/cm or more. The shape of the sulfide solid electrolyte material of the first embodiment is not particularly limited but examples thereof include a powdery shape. In addition, the average particle diameter of the powdery sulfide solid electrolyte material is preferably within a range of 0.1 μm to 50 μm, for example.

The sulfide solid electrolyte material of the first embodiment has so high ion conductivity as to be capable of being used for optional uses in which ion conductivity is required. Above all, the sulfide solid electrolyte material of the first embodiment is preferably used for a battery. The reason therefor is to be capable of greatly contributing to achieving higher output of a battery. Also, a producing method for the sulfide solid electrolyte material of the first embodiment is described in detail in the after-mentioned 'C. Producing method for sulfide solid electrolyte material'. Also, the sulfide solid electrolyte material of the first embodiment may have characteristics of the after-mentioned third embodiment together.

2. Second Embodiment

Next, a second embodiment of a sulfide solid electrolyte material of the present invention is described. The sulfide solid electrolyte material of the second embodiment comprises a Li element, a Ge element, a B element and a S element, characterized in that the sulfide solid electrolyte material has a peak at a position of $2\theta = 29.58° \pm 0.50°$ in X-ray diffraction measurement using a CuKα ray, the sulfide solid electrolyte material does not have a peak at a position of $2\theta = 27.33° \pm 0.50°$ in X-ray diffraction measurement using a CuKα ray or in the case of the sulfide solid electrolyte material having a peak at the position of $2\theta = 27.33° \pm 0.50°$ when diffraction intensity at the peak of $2\theta = 29.58° \pm 0.50°$ is regarded as $I_A$ and diffraction intensity at the peak of $2\theta = 27.33° \pm 0.50°$ is regarded as $I_B$, a value of $I_B/I_A$ is less than 0.50, and a crystal phase having the peak at the position of $2\theta = 29.58° \pm 0.50°$ does not contain a P element, and the B element is located at a site for the P element.

According to the second embodiment, the ratio of a crystal phase having a peak in the vicinity of $2\theta = 29.58°$ is so high as to allow the sulfide solid electrolyte material with favorable ion conductivity. In addition, the predetermined crystal phase does not contain a P element and the B element is located at a site for the P element, so as to allow the sulfide solid electrolyte material with high reduction resistance. Incidentally, the site for the P element signifies a site at which the P element exists in the crystal structure of (as typified by) $Li_{10}GeP_2S_{12}$.

The sulfide solid electrolyte material of the second embodiment comprises the Li element, the Ge element, the B element and the S element. The sulfide solid electrolyte material of the second embodiment may be composed of only the Li element, the Ge element, the B element and the S element, or further comprise another element except the P element. The sulfide solid electrolyte material of the second embodiment is basically the same as the sulfide solid electrolyte material of the first embodiment except for not containing the P element.

The composition of the sulfide solid electrolyte material of the second embodiment is not particularly limited if the composition is a composition such as to allow a predetermined value of $I_B/I_A$. The ratio of the Ge element and the B element is, for example, preferably within a range of Ge:B=1:1.9 to 1:2.1 at molar ratio. The reason is that ion conductance increases.

3. Third Embodiment

Next, a third embodiment of a sulfide solid electrolyte material of the present invention is described. The sulfide solid electrolyte material of the third embodiment has an octahedron O composed of a Li element and a S element, a tetrahedron $T_1$ composed of an $M_a$ element and a S element, and a tetrahedron $T_2$ composed of an $M_b$ element and a S element, the tetrahedron $T_1$ and the octahedron O sharing an edge, and the tetrahedron $T_2$ and the octahedron O containing a crystal structure sharing a corner as the main body, characterized in that the $M_a$ element contains a Ge element and a P element, the $M_b$ element contains a P element, and part of the P element is substituted with a B element.

According to the third embodiment, the octahedron O, the tetrahedron $T_1$ and the tetrahedron $T_2$ have a predetermined crystal structure (a three-dimensional structure), so as to allow the sulfide solid electrolyte material with favorable ion conductivity. In addition, the substitution of part of the P element with a B element allows the sulfide solid electrolyte material with high reduction resistance.

Figure 4:
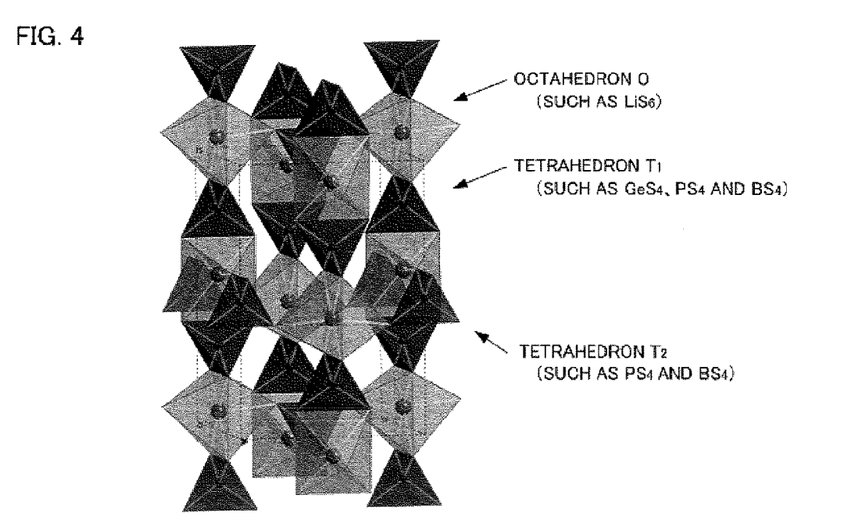
FIG. 4 is a perspective view explaining an example of a crystal structure of a sulfide solid electrolyte material of the present invention.

FIG. 4 is a perspective view explaining an example of a crystal structure of the sulfide solid electrolyte material of the third embodiment. In the crystal structure shown in FIG. 4, the octahedron O typically has Li as the central element, and is $LiS_6$ octahedron having six pieces of S at the corner of the octahedron. The tetrahedron $T_1$ has $M_a$ as the central element, and has four pieces of S at the corner of the tetrahedron; typically, $GeS_4$ tetrahedron, $PS_4$ tetrahedron and $BS_4$ tetrahedron. The tetrahedron $T_2$ has $M_b$ as the central element, and has four pieces of S at the corner of the tetrahedron; typically, $PS_4$ tetrahedron and $BS_4$ tetrahedron. In the third embodiment, part of the P element is substituted with the B element. In addition, the tetrahedron $T_1$ and the octahedron O share an edge, and the tetrahedron $T_2$ and the octahedron O share a corner.

The sulfide solid electrolyte material of the third embodiment is greatly characterized by containing the above-described crystal structure as the main body. The ratio of the above-described crystal structure in the whole crystal structure of the sulfide solid electrolyte material is not particularly limited but is preferably higher. The reason therefor is to allow the sulfide solid electrolyte material with high ion conductivity. The ratio of the above-described crystal structure is, specifically, preferably 70% by weight or more, more preferably 90% by weight or more. Incidentally, the ratio of the above-described crystal structure may be measured by synchrotron radiation XRD, for example. In particular, the sulfide solid electrolyte material of the third embodiment is preferably a single-phase material of the above-described crystal structure. The reason therefor is to allow ion conductivity to be extremely heightened.

In the third embodiment, at least one of the tetrahedron $T_1$ and the tetrahedron $T_2$ may have $BS_4$ tetrahedron. A preferable range of the substituted amount of the B element at a site for the P element and the substituted amount of the B element at a site for the Ge element is as described above. In the third embodiment, when the tetrahedron $T_1$ or the tetrahedron $T_2$ having Ge as the central element is represented by $GeS_{4-x}O_x$ (x is an integer satisfying 0≤x≤4), the ratio of the tetrahedron with large x is preferably large. The reason is to allow the sulfide solid electrolyte material in which reductive decomposition is caused with further difficulty. Specifically, the molar fraction of $GeO_4$ is preferably the largest with respect to all tetrahedrons represented by $GeS_{4-x}O_x$ contained in the sulfide solid electrolyte material. Incidentally, it can be confirmed by XRD pattern analysis and neutron diffraction through Rietveld method that part of the S element is substituted with the O element. The molar fraction of $GeO_4$ may be measured by NMR and XAFS. The sulfide solid electrolyte material of the third embodiment may have the characteristics of the first embodiment described above together.

4. Fourth Embodiment

Next, a fourth embodiment of a sulfide solid electrolyte material of the present invention is described. The sulfide solid electrolyte material of the fourth embodiment has an octahedron O composed of a Li element and a S element, a tetrahedron $T_1$ composed of an $M_a$ element and a S element, and a tetrahedron $T_2$ composed of an $M_b$ element and a S element, the tetrahedron $T_1$ and the octahedron O sharing an edge, and the tetrahedron $T_2$ and the octahedron O containing a crystal structure sharing a corner as the main body, characterized in that the $M_a$ element contains a Ge element and a B element, the $M_b$ element contains a B element, the crystal structure does not contain a P element, and the B element is located at a site for the P element.

According to the fourth embodiment, the octahedron O, the tetrahedron $T_1$ and the tetrahedron $T_2$ have a predetermined crystal structure (a three-dimensional structure), so as to allow the sulfide solid electrolyte material with favorable ion conductivity. In addition, the predetermined crystal structure does not contain a P element and the B element is located at a site for the P element, so as to allow the sulfide solid electrolyte material with high reduction resistance. Incidentally, the site for the P element signifies a site at which the P element exists in the crystal structure of (as typified by) $Li_{10}GeP_2S_{12}$.

Figure 5:
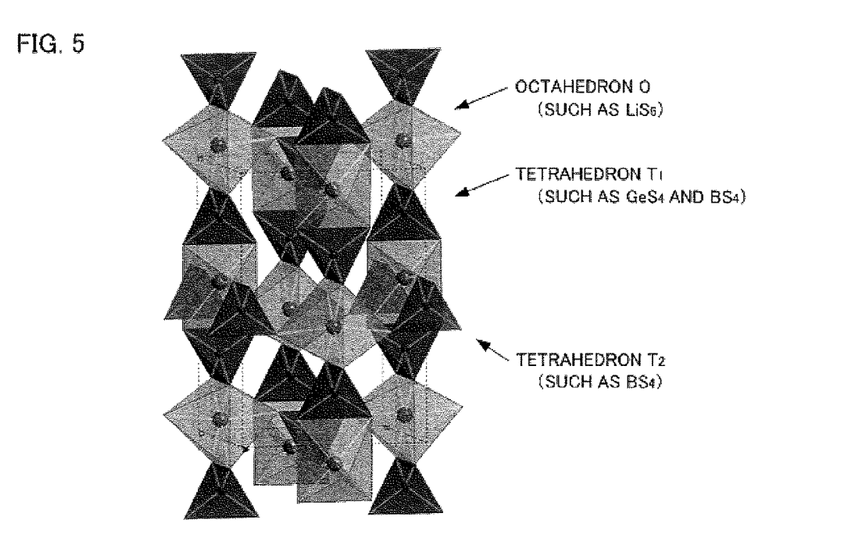
FIG. 5 is a perspective view explaining another example of a crystal structure of a sulfide solid electrolyte material of the present invention.

FIG. 5 is a perspective view explaining an example of a crystal structure of the sulfide solid electrolyte material of the fourth embodiment. In the crystal structure shown in FIG. 5, the octahedron O typically has Li as the central element, and is $LiS_6$ octahedron having six pieces of S at the corner of the octahedron. The tetrahedron $T_1$ has $M_a$ as the central element, and has four pieces of S at the corner of the tetrahedron; typically, $GeS_4$ tetrahedron and $BS_4$ tetrahedron. The tetrahedron $T_2$ has $M_b$ as the central element, and has four pieces of S at the corner of the tetrahedron; typically, $BS_4$ tetrahedron. In the fourth embodiment, the crystal structure does not contain the P element, and the B element is located at a site for the P element. In addition, the tetrahedron $T_1$ and the octahedron O share an edge, and the tetrahedron $T_2$ and the octahedron O share a corner.

The sulfide solid electrolyte material of the fourth embodiment is greatly characterized by including the crystal structure as the main body. The sulfide solid electrolyte material of the fourth embodiment is basically the same as the sulfide solid electrolyte material of the third embodiment except for not containing the P element. The sulfide solid electrolyte material of the fourth embodiment may have the characteristics of the second embodiment described above together.

B. Battery

Next, a battery of the present invention is described. The battery of the present invention is a battery comprising a cathode active material layer containing a cathode active material, an anode active material layer containing an anode active material, and an electrolyte layer formed between the cathode active material layer and the anode active material layer, characterized in that at least one of the cathode active material layer, the anode active material layer and the electrolyte layer contains the sulfide solid electrolyte material described above.

According to the present invention, the use of the sulfide solid electrolyte material described above allows the battery with high output and high reduction resistance.

Figure 6:
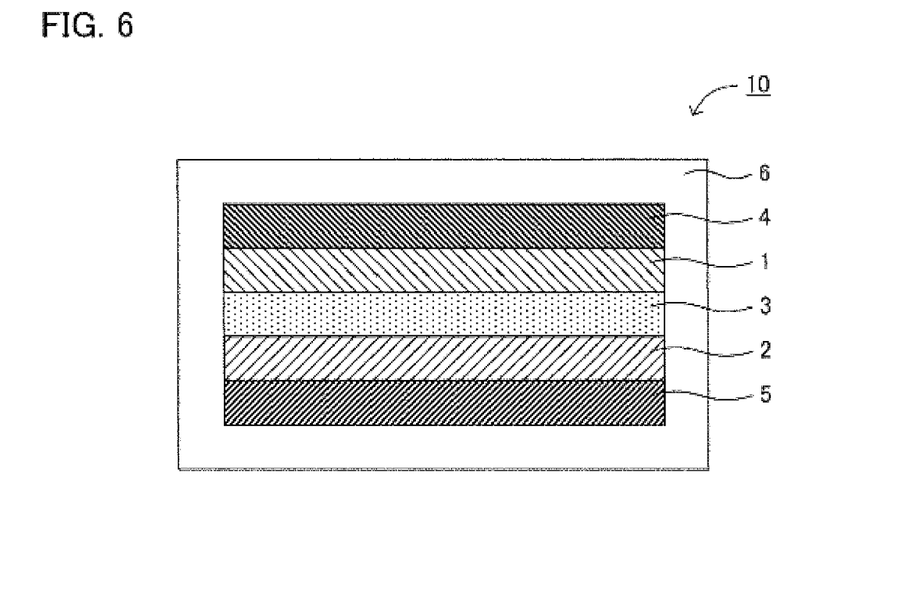
FIG. 6 is a schematic cross-sectional view showing an example of a battery of the present invention.

FIG. 6 is a schematic cross-sectional view showing an example of the battery of the present invention. A battery 10 in FIG. 6 comprises a cathode active material layer 1 containing a cathode active material, an anode active material layer 2 containing an anode active material, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members. In the present invention, at least one of the cathode active material layer 1, the anode active material layer 2 and the electrolyte layer 3 is greatly characterized by containing the sulfide solid electrolyte material described in the 'A. Sulfide solid electrolyte material'.

The battery of the present invention is hereinafter described in each constitution.

1. Anode Active Material Layer

The anode active material layer in the present invention is a layer containing at least an anode active material, and may contain at least one of a solid electrolyte material, a conductive material and a binder, as required. In particular, in the present invention, the anode active material layer contains a solid electrolyte material, which is preferably the sulfide solid electrolyte material described above. The reason therefor is because the above-described the sulfide solid electrolyte material has high reduction resistance. The ratio of the sulfide solid electrolyte material contained in the anode active material layer varies with kinds of a battery and is preferably, for example, within a range of 0.1% by volume to 80% by volume, above all, within a range of 1% by volume to 60% by volume, particularly, within a range of 10% by volume to 50% by volume. Also, examples of an anode active material include a metal active material and a carbon active material. Examples of the metal active material include In, Al, Si, and Sn. On the other hand, examples of the carbon active material include mesocarbon microbeads (MCMB), high orientation property graphite (HOPG), hard carbon and soft carbon.

The anode active material layer may further contain a conductive material. The addition of the conductive material allows conductivity of the anode active material layer to be improved. Examples of the conductive material include acetylene black, Ketjen Black and carbon fiber. The anode active material layer may contain a binder. Examples of kinds of the binder include a fluorine-containing binder such as polyvinylidene fluoride (PVDF). The thickness of the anode active material layer is preferably within a range of 0.1 μm to 1000 μm, for example.

2. Electrolyte Layer

The electrolyte layer in the present invention is a layer formed between the cathode active material layer and the anode active material layer. The electrolyte layer is not particularly limited if the layer is a layer such as to allow ion conduction, but is preferably a solid electrolyte layer composed of a solid electrolyte material. The reason therefor is to allow the battery with high safety as compared with a battery using a liquid electrolyte. In addition, in the present invention, a solid electrolyte layer preferably contains the sulfide solid electrolyte material described above. The ratio of the sulfide solid electrolyte material contained in a solid electrolyte layer is preferably, for example, within a range of 10% by volume to 100% by volume, above all, within a range of 50% by volume to 100% by volume. The thickness of a solid electrolyte layer is preferably within a range of 0.1 μm to 1000 μm, for example, and within a range of 0.1 μm to 300 μm, above all. Also, examples of a method for forming a solid electrolyte layer include a method for compression-molding a solid electrolyte material.

Also, the electrolyte layer in the present invention may be a layer composed of a liquid electrolyte. The case of using a liquid electrolyte allows the higher-output battery though safety needs to be further considered as compared with the case of using a solid electrolyte layer. Also, in this case, ordinarily, at least one of the cathode active material layer and the anode active material layer contains the sulfide solid electrolyte material described above. A liquid electrolyte ordinarily contains a lithium salt and an organic solvent (a nonaqueous solvent). Examples of the lithium salt include inorganic lithium salts such as $LiPF_6$, $LiBF_4$, $LiClO_4$ and $LiAsF_6$, and organic lithium salts such as $LiCF_3SO_3$, $LiN(CF_3SO_2)_2$, $LiN(C_2F_5SO_2)_2$ and $LiC(CF_3SO_2)_3$. Examples of the organic solvent include ethylene carbonate (EC), propylene carbonate (PC), dimethyl carbonate (INC), diethyl carbonate (DEC), ethylmethyl carbonate (EMC) and butylene carbonate (BC).

3. Cathode Active Material Layer

The cathode active material layer in the present invention is a layer containing at least a cathode active material, and may contain at least one of a solid electrolyte material, a conductive material and a binder, as required. In particular, in the present invention, the cathode active material layer contains a solid electrolyte material, which is preferably the sulfide solid electrolyte material described above. The ratio of the sulfide solid electrolyte material contained in the cathode active material layer varies with kinds of a battery and is preferably, for example, within a range of 0.1% by volume to 80% by volume, above all, within a range of 1% by volume to 60% by volume, particularly, within a range of 10% by volume to 50% by volume. Also, examples of a cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}CO_{1/3}Mn_{1/3}O_2$. The conductive material and the binder used for the cathode active material layer are the same as those explained in the above-described anode active material layer. The thickness of the cathode active material layer is preferably within a range of 0.1 μm to 1000 μm, for example.

4. Other Constitutions

The battery of the present invention comprises at least the anode active material layer, electrolyte layer and cathode active material layer described above, ordinarily further comprising a cathode current collector for collecting the cathode active material layer and an anode current collector for collecting the anode active material layer. Examples of a material for the cathode current collector include SUS, aluminum, nickel, iron, titanium and carbon. On the other hand, examples of a material for the anode current collector include SUS, copper, nickel and carbon. Also, the thickness and shape of the cathode current collector and the anode current collector are preferably selected properly in accordance with factors such as uses of a battery. Also, a battery case of a general battery may be used for a battery case used for the present invention. Examples of the battery case include a battery case made of SUS.

5. Battery

The battery of the present invention may be a primary battery or a secondary battery, preferably a secondary battery among them. The reason therefor is to be repeatedly charged and discharged and be useful as a car-mounted battery, for example. Examples of the shape of the battery of the present invention include a coin shape, a laminate shape, a cylindrical shape and a rectangular shape. Also, a producing method for the battery of the present invention is not particularly limited if the method is a method such as to allow the battery described above, but the same method as a producing method for a general battery may be used. For example, in the case where the battery of the present invention is an all solid state battery, examples of a producing method therefor include a method such that a material composing a cathode active material layer, a material composing a solid electrolyte layer and a material composing an anode active material layer are sequentially pressed to thereby produce a power generating element and this power generating element is stored inside a battery case, which is crimped.

C. Producing Method for Sulfide Solid Electrolyte Material

Next, a producing method for a sulfide solid electrolyte material of the present invention is described. The producing method for a sulfide solid electrolyte material of the present invention is a producing method for the sulfide solid electrolyte material described above, comprising an ion conductive material synthesizing process of synthesizing an amorphized ion conductive material by mechanical milling with a raw material composition containing a constituent of the sulfide solid electrolyte material, and a heating process of obtaining the sulfide solid electrolyte material by heating the amorphized ion conductive material.

According to the present invention, amorphization is performed in the ion conductive material synthesizing step to thereafter perform the heating step, so as to allow the sulfide solid electrolyte material such that the ratio of a crystal phase having a peak in the vicinity of $2\theta=29.58°$ is high. Thus, the sulfide solid electrolyte material with favorable ion conductivity may be obtained. In addition, the B element is located at a site for the P element, so as to allow the sulfide solid electrolyte material with high reduction resistance.

Figure 7:
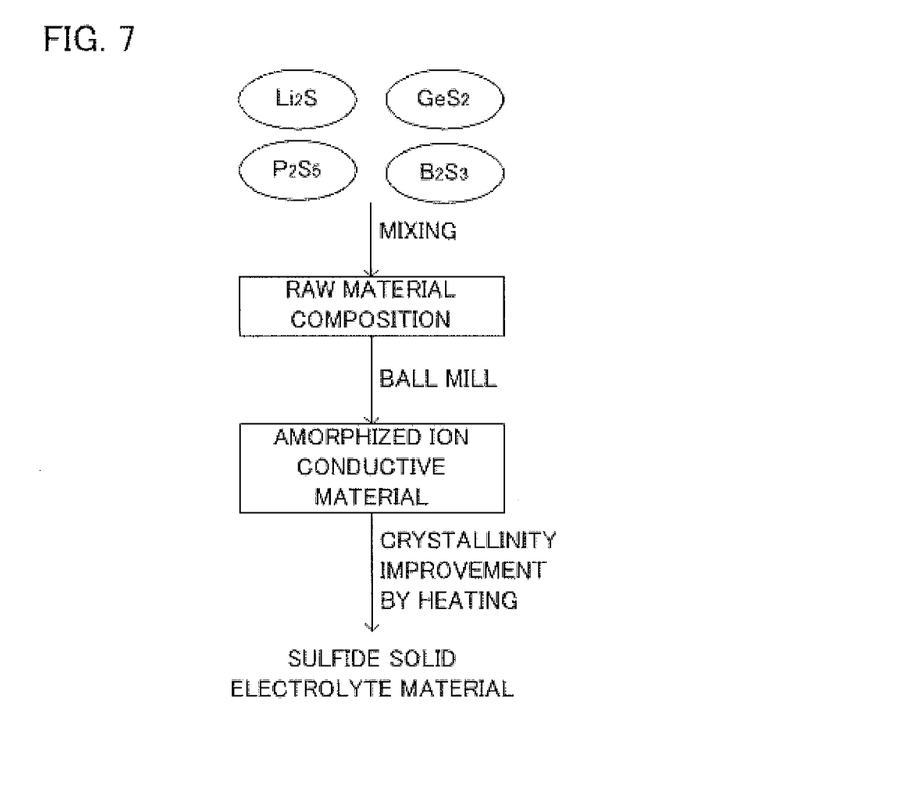
FIG. 7 is an explanatory view showing an example of a producing method for a sulfide solid electrolyte material of the present invention.

FIG. 7 is an explanatory view showing an example of the producing method for the sulfide solid electrolyte material of the present invention. In the producing method for the sulfide solid electrolyte material in FIG. 7, first, a raw material composition is produced by mixing $Li_2S$, $P_2S_5$, $GeS_2$ and $B_2S_3$. On this occasion, in order to prevent the raw material composition from deteriorating due to moisture in the air, the raw material composition is preferably produced under an inert gas atmosphere. Next, ball mill is performed for the raw material composition to obtain an amorphized ion conductive material. Next, the amorphized ion conductive material is heated for improving crystallinity to thereby obtain a sulfide solid electrolyte material.

The first embodiment allows the sulfide solid electrolyte material such that the ratio of a crystal phase having a peak in the vicinity of $2\theta=29.58°$ is high; below, the reason therefor is described. In the first embodiment, the amorphized ion conductive material is once synthesized unlike a conventional synthesis method, which is a solid-phase method. Thus, it is conceived that an environment such that the crystal phase A with high ion conductivity (the crystal phase having a peak in the vicinity of $2\theta=$) $29.58°$ is easily precipitated is brought and the crystal phase A may be precipitated so positively by the heating step thereafter as to allow a value of $I_B/I_A$ to become less than 0.50, which has been conventionally impossible. The reason why an environment such that the crystal phase A is easily precipitated is brought by amorphizing is not completely clear, but it is conceived that there is a possibility that a solution range in the ion conductive material is changed by mechanical milling and an environment such that the crystal phase A is precipitated with difficulty changes into an environment such that the crystal phase A is easily precipitated.

The producing method for the sulfide solid electrolyte material of the present invention is hereinafter described in each step.

1. Ion Conductive Material Synthesizing Step

First, an ion conductive material synthesizing step in the present invention is described. The ion conductive material synthesizing step in the present invention is a process of synthesizing an amorphized ion conductive material by mechanical milling with a raw material composition containing a constituent of the sulfide solid electrolyte material.

The raw material composition in the present invention contains at least the Li element, the Ge element, the B element and the S element, and occasionally contains the P element further. The raw material composition may contain another element such as the O element. Examples of a compound containing the Li element include an Li sulfide and an Li oxide. Specific examples of the Li sulfide include $Li_2S$. Specific examples of the Li oxide include $Li_2O$.

Examples of a compound containing the Ge element include a simple substance of Ge, a Ge oxide and a Ge sulfide. Specific examples of the Ge sulfide include $GeS_2$. Specific examples of the Ge oxide include $GeO_2$. In the present invention, the raw material composition preferably contains a material having a Ge—O bond. The reason is to allow the sulfide solid electrolyte material in which reductive decomposition is caused with further difficulty. Examples of the material having a Ge—O bond include $GeO_2$, $Li_4Ge(S_xO_{1-x})_4$ ($0 \leq x < 1$) and $Li_2GeO_3$. Examples of a compound containing the B element include a simple substance of B, a B oxide and a B sulfide. Specific examples of the B sulfide include $B_2S_3$. Specific examples of the B oxide include $B_2O_3$. Examples of a compound containing the P element include a simple substance of P, a P oxide and a P sulfide. Specific examples of the P sulfide include $P_2S_5$. Specific examples of the P oxide include $P_2O_5$.

Mechanical milling is a method for grinding a test sample while allowing mechanical energy thereto. In the present invention, an amorphized ion conductive material is synthesized by allowing mechanical energy to the raw material composition. Examples of such mechanical milling include vibrating mill, ball mill, turbo mill, mechano-fusion and disk mill; among them, preferably vibrating mill and ball mill.

The conditions of vibrating mill are not particularly limited if the conditions are such as to allow an amorphized ion conductive material. The vibration amplitude of vibrating mill is preferably, for example, within a range of 5 mm to 15 mm, above all, within a range of 6 mm to 10 mm. The vibration frequency of vibrating mill is preferably, for example, within a range of 500 rpm to 2000 rpm, above all, within a range of 1000 rpm to 1800 rpm. The filling factor of a test sample of vibrating mill is preferably, for example, within a range of 1% by volume to 80% by volume, above all, within a range of 5% by volume to 60% by volume, particularly, within a range of 10% by volume to 50% by volume. Also, a vibrator (such as a vibrator made of alumina) is preferably used for vibrating mill.

The conditions of ball mill are not particularly limited if the conditions are such as to allow an amorphized ion conductive material. Generally, larger number of revolutions brings higher production rate of the ion conductive material, and longer treating time brings higher conversion ratio of the raw material composition into the ion conductive material. The number of weighing table revolutions in performing planetary ball mill is preferably within a range of 200 rpm to 500 rpm, for example, and within a range of 250 rpm to 400 rpm, above all. Also, the treating time in performing planetary ball mill is preferably within a range of 1 hour to 100 hours, for example, and within a range of 1 hour to 70 hours, above all.

Incidentally, in the present invention, the amorphized ion conductive material is preferably synthesized so as to bring an environment such that the crystal phase having a peak in the vicinity of 2θ=29.58° is easily precipitated. In the present invention, the process of synthesizing the ion conductive material may be performed by a single-step process or by dividing into a plurality of processes. In the case of obtaining the sulfide solid electrolyte material in which part of the P element is substituted with the B element, LiPBS may be synthesized by performing mechanical milling with a first raw material composition containing Li, P, B and S, LiGeS may be separately synthesized by performing mechanical milling with a second raw material composition containing Li, Ge and S, and lastly the ion conductive material may be synthesized by performing mechanical milling with the LiPBS and the LiGeS.

2. Heating Step

The heating step in the first embodiment is a step of obtaining the sulfide solid electrolyte material by heating the amorphized ion conductive material.

In the present invention, the improvement of crystallinity is intended by heating the amorphized ion conductive material. This heating allows the crystal phase A with high ion conductivity (the crystal phase having a peak in the vicinity of 2θ=29.58° to be precipitated so positively as to allow a value of $I_B/I_A$ to become less than 0.50, which has been conventionally impossible.

The heating temperature in the present invention is not particularly limited if the heating temperature is a temperature such as to allow a desired sulfide solid electrolyte material to be obtained, but is preferably a temperature of crystallization temperature or more of the crystal phase A (the crystal phase having a peak in the vicinity of 2θ=29.58°). Specifically, the heating temperature is preferably 300° C. or more, more preferably 350° C. or more, far more preferably 400° C. or more, particularly preferably 450° C. or more. On the other hand, the heating temperature is preferably 1200° C. or less, more preferably 1100° C. or less, far more preferably 1000° C. or less, particularly preferably 950° C. or less. Also, the heating time is preferably adjusted properly so as to allow a desired sulfide solid electrolyte material to be obtained. Also, heating in the present invention is preferably performed under an inert gas atmosphere or in a vacuum from the viewpoint of preventing oxidation. Also, the sulfide solid electrolyte material obtained by the present invention is the same as the contents described in the 'A. Sulfide solid electrolyte material'; therefore, the description herein is omitted.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Example 1-1

With regard to the case where all P in $Li_{10}GeP_2S_{12}$ is substituted with B (specifically, $Li_{14}GeB_2S_{12}$), whether a predetermined crystal structure in the present invention may exist or not was assumed from enthalpy change of formation. The enthalpy of formation was calculated from the following formula.

Enthalpy of formation=$-14E_{tot}$(Li metal)$-E_{tot}$(Ge metal)$-2E_{tot}$(B crystal)$-12E_{tot}$(S crystal)$+E_{tot}$($Li_{14}GeB_2S_{12}$ crystal)

Incidentally, $E_{tot}$ is energy of each one atom in the total energy of an electronic state of a crystal calculated from first-principle calculation.

Here, the first-principle calculation is a high-precision calculation technique based on a density functional theory without including an experience parameter. The first-principle calculation is performed in the following manner. First, a calculation model is constructed on the basis of the experimental value of lattice constant, space group and atomic coordinate of a relevant crystal. Next, lattice constant and atom position are optimized so that internal energy is minimized by a structural optimized calculation tool in general first-principle calculation software (such as CASTEP and VASP). Simultaneously therewith, the total energy of an electronic state of a crystal is calculated. The enthalpy of formation is calculated by the calculation formula on the basis of the obtained total energy of an electronic state of each crystal. As a technique of the first-principle calculation, plane wave basis, generalized gradient approximation (GGA-PEE) and PAW method are used for the description of electron wave function, exchange interaction and the handling of inner-shell electron. The calculating conditions are optimized in each crystal.

The enthalpy of formation of each structure in the following decomposition reaction formulae was obtained by the first-principle calculation to calculate reduction potential from Nernst equation.

(The Case of B Reduction)

$Li_{14}GeB_2S_{12}+6Li^++6e^-\rightarrow Li_4GeS_4+2B+8Li_2S$ (The Case of Ge Reduction)

$Li_{14}GeB_2S_{12}+8Li^++8e^-\rightarrow 2Li_5BS_3+Ge+6Li_2S$

Example 1-2

When part of P in $Li_{10}GeP_2S_{12}$ is substituted with B (specifically, $Li_{12}GePBS_{12}$), whether a predetermined crystal structure in the present invention may exist or not was assumed from enthalpy change of formation. The enthalpy of formation was calculated from the following formula.

Enthalpy of formation=−12$E_{tot}$(Li metal)−$E_{tot}$(Ge metal)−$E_{tot}$(P crystal)−$E_{tot}$(B crystal)−12$E_{tot}$(S crystal)+$E_{tot}$(Li$_{12}$GePBS$_{12}$ crystal)

The enthalpy of formation of each structure in the following decomposition reaction formulae was obtained by the first-principle calculation to calculate reduction potential from Nernst equation.

(The Case of B Reduction)

Li$_{12}$GeBPS$_{12}$+3Li$^-$−3$e^-$→Li$_4$GeS$_4$+Li$_3$PS$_4$+B+4Li$_2$S (The Case of Ge Reduction)

Li$_{12}$GeBPS$_{12}$+6Li$^+$+6$e^-$→Li$_5$BS$_3$+Li$_3$PS$_4$+Ge+5L±$_2$S

Example 1-3

When all P in Li$_{10}$GeP$_2$S$_{12}$ is substituted with B and all S coordinated to Ge is substituted with O (specifically, Li$_{14}$(GeO$_4$)(BS$_4$)$_2$), whether a predetermined crystal structure in the present invention may exist or not was assumed from enthalpy change of formation. The enthalpy of formation was calculated from the following formula.

Enthalpy of formation=−14$E_{tot}$(Li metal)−$E_{tot}$(Ge metal)−$E_{tot}$(B crystal)−4$E_{tot}$(O$_2$ gas)−$E_{tot}$(S crystal)+$E_{tot}$(Li$_{14}$(GeO$_4$)(BS$_4$)$_2$ crystal)

The enthalpy of formation of each structure in the following decomposition reaction formulae was obtained by the first-principle calculation to calculate reduction potential from Nernst equation.

(The Case of B Reduction)

Li$_{14}$(GeO$_4$)(BS$_4$)$_2$+6Li$^+$+6$e^-$→Li$_4$GeO$_4$+2B+8Li$_2$S (The Case of Ge Reduction)

Li$_{14}$(GeO$_4$)(BS$_4$)$_2$+8Li$^+$+8$e^-$→2Li$_5$BS$_3$+Ge+2Li$_2$S+4Li$_2$O

[Evaluations]

The enthalpy of formation and reduction potential calculated in Examples 1-1 to 1-3 are shown in Table 1.

TABLE 1

| | Condition | Example 1-1 (Li14GeB2S12) | Example 1-2 (Li12GeBPS12) | Example 1-3 (Li14(GeO4)(BS4)2) |
|---|---|---|---|---|
| Reduction Potential (V vs. Li/Li+) | B reduction Case | 2.129 | 2.114 | 2.359 |
| Enthalpy of Formation (eV) | B reduction Case | −12.78 | −12.68 | −14.15 |
| Reduction Potential (V vs. Li/Li+) | Ge reduction Case | 1.87 | 1.85 | 1.62 |

Any enthalpy of formation in Examples 1-1 to 1-3 was found to be negative. In the process of changing from a reactant to a product, this fact signifies that heat is emitted out of a reaction system to offer an exothermic reaction, namely, a product may exist. Any reduction potential in the case of B reduction were found to be a higher value than the reduction potential in the case of Ge reduction. This fact signifies that B is produced before Ge. That is to say, only an insulator is produced in the first reaction to allow a film to be formed. In the case of B reduction, Example 1-3 shown higher reduction potential than Example 1-1. The reason is conceived to be that the selective coordination of Ge with O improved electrochemical stability (reduction resistance) further. That is to say, from the viewpoint of electrochemical stability, it was suggested that a Ge—O bond was preferable than a Ge—S bond and a GeO$_4$ tetrahedron was formed more preferably.

Example 2-1

Figure 8:
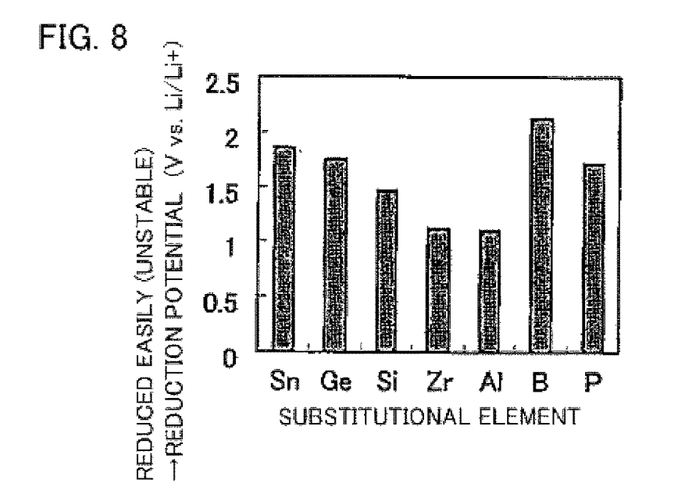
FIG. 8 is a result of reduction potential in the case of substituting a P element of a sulfide solid electrolyte material with another element.

Reduction potential when all P in Li$_{10}$GeP$_2$S$_{12}$ is substituted with other elements (Sn, Ge, Si, Zr, Al and B) was calculated in the same manner as the above. The results are shown in FIG. 8. As shown in FIG. 8, Sn and B were suggested as elements which are reduced more easily than Ge; however, zerovalent B having insulation properties is preferable for the reason that zerovalent Sn has conductivity.

Example 2-2

Figure 9A:
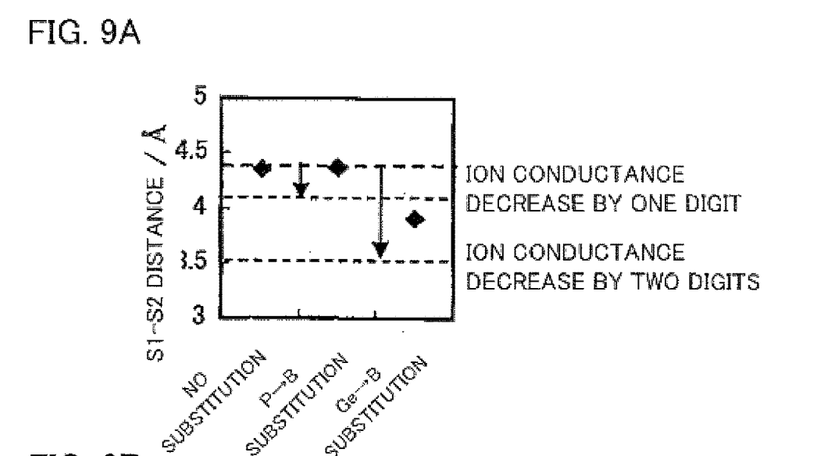
FIGS. 9A and 9B are each a result of an S—S distance in the case of substituting a P element or a Ge element of a sulfide solid electrolyte material with a B element.
Figure 9B:
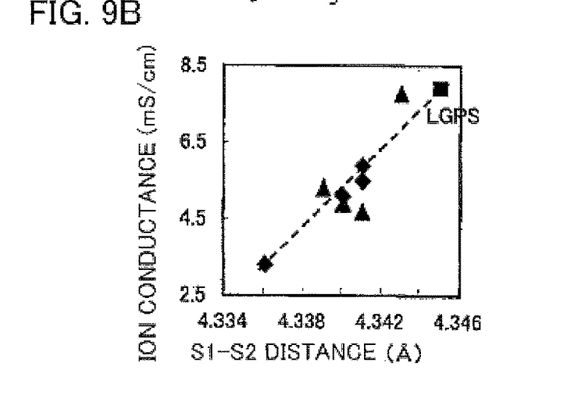

The S—S distance of Li$_{10}$GeP$_2$S$_{12}$ (LOPS), Li$_{10}$GeB$_2$S$_{12}$ (LOBS) and Li$_{10}$BP$_2$S$_{12}$ (LBPS) was calculated by the first-principle calculation. The Li conducting path in these crystal structures is in the c-axis direction, and the S—S distance signifies a distance between S—S distance orthogonal to the c-axis, namely, a distance corresponding to the width of the Li ion conducting path. The results are shown in FIG. 9A. As shown in FIG. 9A, when P was substituted with B, the S—S distance did not change. The reason is conceived to be that P and B are close in ionic radius, and distortion of a crystal lattice due to the substitution is small. Meanwhile, when Ge was substituted with B, the S—S distance shortened. In contrast, FIG. 9B shows a relation between the S—S distance and the ion conductance (experimental value) in LGPS. As shown in FIG. 9B, it is suggested that shorter S—S distance tends to bring smaller ion conductance. On the basis of this tendency, it was suggested that the ion conductance decreased by approximately one to two digits when Ge was substituted with B.

Example 3-1

First, a mixture of boron (manufactured by Sigma-Aldrich Co. LLC.) and sulfur (manufactured by Sigma-Aldrich Co. LLC.) was burned at a temperature of 900° C. under an inert gas atmosphere to prepare B$_2$S$_3$ as one of starting materials. Next, lithium sulfide (Li$_2$S, manufactured by Nippon Chemical Industrial Co., Ltd.) and germanium sulfide (GeS$_2$, manufactured by Kojundo Chemical Lab. Co., Ltd.) were prepared as another starting material. These powders were mixed in a glove box under an argon atmosphere at a ratio of 0.5462 g of Li$_2$S, 0.2001 g of B$_2$S$_3$ and 0.2322 g of GeS$_2$ so as to allow a composition of Li$_{4.66}$Ge$_{0.33}$B$_{0.67}$S$_4$ to obtain a raw material composition. Next, 1 g of the raw material composition was put in a pot made of zirconia (45 ml) together with zirconia ball (10 mm φ, 10 pieces) to hermetically seal the pot completely (an argon atmosphere). This pot was mounted on a planetary ball milling machine (P7™ manufactured by Fritsch Japan Co., Ltd.) to perform mechanical milling for 40 hours at the number of weighing table revolutions of 370 rpm. Thus, an amorphized ion conductive material was obtained.

Next, powder of the obtained ion conductive material was put in a carbon-coated quartz tube and vacuum-sealed. The pressure of the quartz tube for vacuum-sealing was approximately 30 Pa. Next, the quartz tube was placed in a burning furnace, heated from room temperature to 550° C. over 6 hours, maintained at 550° C. for 8 hours, and thereafter slowly cooled up to room temperature. Thus, a crystalline sulfide solid electrolyte material (LGBS) having a composition of $Li_{4.66}Ge_{0.33}B_{0.67}S_4$ was obtained.

Example 3-2

Diphosphorus pentasulfide ($P_2S_5$, manufactured by Sigma-Aldrich Co. LLC.) was further used as a starting material, and mixed at a ratio of (0.5462-0.1559×) g of $Li_2S$, 0.3775×g of $P_2S_5$, (0.2001-0.2001×) g of $B_2S_3$ and 0.2322 g of $GeS_2$ so as to allow a composition of $Li_{4.66-1.33x}Ge_{0.33}P_{0.67x}B_{0.67-0.67x}S_4$ to obtain a raw material composition. A crystalline sulfide solid electrolyte material (LGPBS) was obtained in the same manner as Example 3-1 except for using this raw material composition. x=0.5 corresponds to B substituted amount of 50 mol % and x=0.75 corresponds to B substituted amount of 25 mol %.

Comparative Example 1-1

$P_2S_5$ was used as a starting material instead of $B_2S_3$, and mixed at a ratio of 0.3903 g of $Li_2S$, 0.3775 g of $P_2S_5$ and 0.2322 g of $GeS_2$ so as to obtain a raw material composition of $Li_{3.33}Ge_{0.33}P_{0.67}S_4$. A crystalline sulfide solid electrolyte material (LGPS) was obtained in the same manner as Example 3-1 except for using this raw material composition. Incidentally, this composition corresponds to x=1 of the general formula in Example 3-2. The results of Example 3-2 and Comparative Example 1-1 are shown in Table 2.

TABLE 2

| | B Substituted Amount (mol %) | x | Composition |
|---|---|---|---|
| Example 3-2 | 50 | 0.5 | $Li_{3.995}G_{0.33}P_{0.335}B_{0.335}S_4$ |
| Example 3-2 | 25 | 0.75 | $Li_{3.6625}G_{0.33}P_{0.5025}B_{0.1675}S_4$ |
| Example 1-1 | 0 | 1 | $Li_{3.33}G_{0.33}P_{0.67}S_4$ |

[Evaluations]
(X-Ray Diffraction Measurement)

X-ray diffraction (XRD) measurement was performed by using the sulfide solid electrolyte material obtained in Examples 3-1 and 3-2 and Comparative Example 1-1. As a result, the peak of the crystal phase A described above was confirmed.

(Reductive Decomposition Evaluation)

An evaluation battery was produced by using the sulfide solid electrolyte material obtained in Example 3-2 and Comparative Example 1-1. First, the $Li_3PS_4$ powder was weighed by 100 mg, put in a cylinder made of macole, and pressed at a pressure of 1 ton/cm² to obtain a solid electrolyte layer. Next, the sulfide solid electrolyte material and graphite powder were mixed at a weight ratio of 50:50, and the obtained powder was weighed by 12 mg, disposed on one surface of the solid electrolyte layer, and pressed at a pressure of 4 ton/cm² to obtain a working electrode. Lastly, an LiIn foil as a reference electrode was disposed on the other surface of the solid electrolyte layer, pressed at a pressure of 1 ton/cm², and bolted at 6 Ncm to obtain a battery for evaluation.

Figure 10:
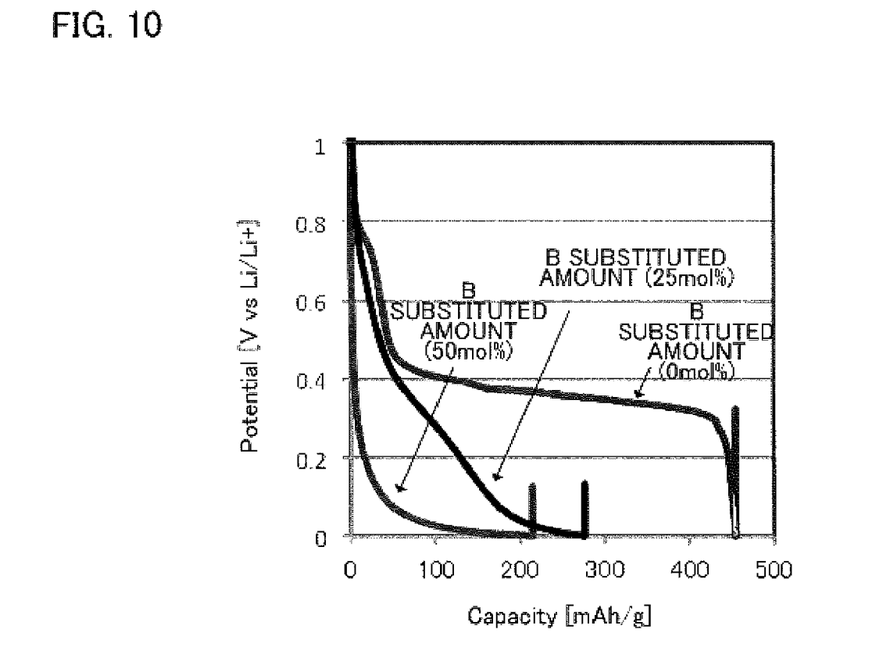
FIG. 10 is a result of reductive decomposition evaluation of an evaluation battery using a sulfide solid electrolyte materials obtained in Example 3-2 and Comparative Example 1-1.

The electric potential of the working electrode was lowered up to −0.62 V (vs LiIn) at a current density of 0.01 mA/cm² with respect to the obtained battery for evaluation. The results are shown in FIG. 10. Incidentally, in FIG. 10, the measured potential is modified into an electric potential on the basis of Li/Li⁺ by adding 0.62 V thereto. As shown in FIG. 10, it was confirmed that the substitution of the P element with the B element decreased decomposition current amount. When the B substituted amount is 25 mol %, the decomposition current amount were found to be ½ or less as compared with the case where the B substituted amount is 0 mol %. When the substituted amount is 50 mol %, the decomposition current amount were found to be ⅛ or less as compared with the case where the B substituted amount is 0 mol %. Incidentally, this value was calculated from an intersection point of the line of Y=0.08 (V) and each measurement line. When the B substituted amount is 0 mol %, the capacity was approximately 450 mAh/g, when the B substituted amount is 25 mol %, the capacity was approximately 170 mAh/g, and when the B substituted amount is 50 mol %, the capacity was approximately 50 mAh/g.

Comparative Example 1-2

$P_2S_5$ was used as a starting material instead of $GeS_2$, and mixed at a ratio of 0.4291 g of $Li_2S$, 0.1000 g of $B_2S_3$ and 0.3775 g of $P_2S_5$ so as to allow a composition of $Li_{3.33}B_{0.33}P_{0.67}S_4$ to obtain a raw material composition. A crystalline sulfide solid electrolyte material (LBPS) was obtained in the same manner as Example 3-1 except for using this raw material composition.

REFERENCE SIGNS LIST

1 cathode active material layer
2 anode active material layer
3 electrolyte layer
4 cathode current collector
5 anode current collector
6 battery case
10 battery

What is claimed is:

1. A sulfide solid electrolyte material comprising: a Li element; a Ge element; a P element; and a S element, wherein
   the sulfide solid electrolyte material has a peak at a position of 2θ=29.58°±0.50° in X-ray diffraction measurement using a CuKα ray,
   the sulfide solid electrolyte material does not have a peak at a position of 2θ=27.33°±0.50° in X-ray diffraction measurement using a CuKα ray or
   in a case of the sulfide solid electrolyte material having a peak at the position of 2θ=27.33°±0.50°, when diffraction intensity at the peak of 2θ=29.58°±0.50° is regarded as $I_A$ and diffraction intensity at the peak of 2θ=27.33°±0.50° is regarded as $I_B$, a value of $I_B/I_A$ is less than 0.50, and
   a part of the P element in a crystal phase having the peak at the position of 2θ=29.58°±0.50° is substituted with a B element.

2. A sulfide solid electrolyte material comprising: a Li element; a Ge element; a B element; and a S element, wherein the sulfide solid electrolyte material has a peak at a position of $2\theta=29.58°\pm0.50°$ in X-ray diffraction measurement using a CuKα ray, the sulfide solid electrolyte material does not have a peak at a position of $2\theta=27.33°\pm0.50°$ in X-ray diffraction measurement using a CuKα ray or in a case of the sulfide solid electrolyte material having a peak at the position of $2\theta=27.33°\pm0.50°$, when diffraction intensity at the peak of $2\theta=29.58°\pm0.50°$ is regarded as $I_A$ and diffraction intensity at the peak of $2\theta=27.33°\pm0.50°$ is regarded as $I_B$, a value of $I_B/I_A$ is less than 0.50, and a crystal phase having the peak at the position of $2\theta=29.58°\pm0.50°$ does not contain a P element, and the B element is located at a site for the P element in a crystal structure of $Li_{10}GeP_2S_{12}$.

3. A sulfide solid electrolyte material having an octahedron O composed of a Li element and a S element, a tetrahedron $T_1$ composed of an $M_a$ element and a S element, and a tetrahedron $T_2$ composed of an $M_b$ element and a S element, the tetrahedron $T_1$ and the octahedron O sharing an edge, and the tetrahedron $T_2$ and the octahedron O containing a crystal structure sharing a corner as a main body, wherein the $M_a$ element contains a Ge element and a P element, the $M_b$ element contains a P element, and a part of the P element is substituted with a B element.

4. A sulfide solid electrolyte material having an octahedron O composed of a Li element and a S element, a tetrahedron $T_1$ composed of an $M_a$ element and a S element, and a tetrahedron $T_2$ composed of an $M_b$ element and a S element, the tetrahedron $T_1$ and the octahedron O sharing an edge, and the tetrahedron $T_2$ and the octahedron O containing a crystal structure sharing a corner as a main body, wherein the $M_a$ element contains a Ge element and a B element, the $M_b$ element contains a B element, and the crystal structure does not contain a P element and the B element is located at a site for the P element in a crystal structure of $Li_{10}GeP_2S_{12}$.

5. A battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material according to claim 1.

6. A battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material according to claim 2.

7. A battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material according to claim 3.

8. A battery comprising a cathode active material layer containing a cathode active material, an anode active material layer containing an anode active material, and an electrolyte layer formed between the cathode active material layer and the anode active material layer, wherein at least one of the cathode active material layer, the anode active material layer and the electrolyte layer contains the sulfide solid electrolyte material according to claim 4.

9. A producing method for a sulfide solid electrolyte material, the sulfide solid electrolyte material being the sulfide solid electrolyte material according to claim 1, comprising:

an ion conductive material synthesizing process of synthesizing an amorphized ion conductive material by mechanical milling with a raw material composition containing a constituent of the sulfide solid electrolyte material; and a heating process of obtaining the sulfide solid electrolyte material by heating the amorphized ion conductive material.

10. A producing method for a sulfide solid electrolyte material, the sulfide solid electrolyte material being the sulfide solid electrolyte material according to claim 2, comprising:

an ion conductive material synthesizing process of synthesizing an amorphized ion conductive material by mechanical milling with a raw material composition containing a constituent of the sulfide solid electrolyte material; and a heating process of obtaining the sulfide solid electrolyte material by heating the amorphized ion conductive material.

11. A producing method for a sulfide solid electrolyte material, the sulfide solid electrolyte material being the sulfide solid electrolyte material according to claim 3, comprising:

an ion conductive material synthesizing process of synthesizing an amorphized ion conductive material by mechanical milling with a raw material composition containing a constituent of the sulfide solid electrolyte material; and a heating process of obtaining the sulfide solid electrolyte material by heating the amorphized ion conductive material.

12. A producing method for a sulfide solid electrolyte material, the sulfide solid electrolyte material being the sulfide solid electrolyte material according to claim 4, comprising:

an ion conductive material synthesizing process of synthesizing an amorphized ion conductive material by mechanical milling with a raw material composition containing a constituent of the sulfide solid electrolyte material; and a heating process of obtaining the sulfide solid electrolyte material by heating the amorphized ion conductive material.

* * * * *